United States Patent

Hite et al.

Patent Number: 6,002,393
Date of Patent: Dec. 14, 1999

[54] SYSTEM AND METHOD FOR DELIVERING TARGETED ADVERTISEMENTS TO CONSUMERS USING DIRECT COMMANDS

[76] Inventors: Kenneth C. Hite, 3 Center Knolls, Bronxville, N.Y. 10708; Walter S. Ciciora, 45 Hulls Farms Rd., Southport, Conn. 06490-1027; Tom Alison, 280 Barrataria Dr., St. Augustine, Fla. 32086; Robert G. Beauregard, 66 E. Parkway, Apt. 1J, Scarsadale, N.Y. 10583

[21] Appl. No.: 08/517,838

[22] Filed: Aug. 22, 1995

[51] Int. Cl.⁶ .................................................. H04N 7/10
[52] U.S. Cl. .................. 345/327; 348/2; 348/9; 348/10
[58] Field of Search ................. 348/1, 2, 3, 9, 348/4, 6, 7, 10, 12, 13; 455/3.1, 4.1, 4.2, 5.1, 6.1, 6.2, 2; 345/323; 709/217–219; H04N 7/10

[56] References Cited

U.S. PATENT DOCUMENTS

| | | |
|---|---|---|
| Re. 33,808 | 1/1992 | Wright, Jr. . |
| 4,331,973 | 5/1982 | Eskin et al. . |
| 4,331,974 | 5/1982 | Cogswell et al. . |
| 4,404,589 | 9/1983 | Wright, Jr. . |
| 4,814,883 | 3/1989 | Perine et al. . |
| 5,099,319 | 3/1992 | Esch et al. . |
| 5,155,591 | 10/1992 | Wacob .................................. 348/10 X |
| 5,200,822 | 4/1993 | Bronfin et al. . |
| 5,231,494 | 7/1993 | Wachob . |
| 5,319,455 | 6/1994 | Hoarty et al. ................................. 348/7 |
| 5,424,770 | 6/1995 | Schmelzer et al. . |
| 5,446,919 | 8/1995 | Wilkins ................................... 455/6.2 |
| 5,495,283 | 2/1996 | Cowe . |
| 5,515,098 | 5/1996 | Carles . |
| 5,636,346 | 6/1997 | Saxe ....................................... 455/2 X |
| 5,652,615 | 7/1997 | Bryant et al. . |
| 5,661,516 | 8/1997 | Carles . |
| 5,774,170 | 6/1998 | Hite et al. . |
| 5,805,974 | 9/1998 | Hite et al. . |

*Primary Examiner*—Nathan Flynn
*Attorney, Agent, or Firm*—Ostrolenk, Faber, Gerb & Soffen, LLP

[57] ABSTRACT

A system and method for targeting TV advertisements to individual consumers delivering a plurality of advertisements to a display site. A command signal is sent to the display site commanding the display of a selected advertisement suited for the individual consumer. In another embodiment, a predetermined advertisement is delivered upon command from a control center to a viewing site intended for the particular consumer.

70 Claims, 8 Drawing Sheets

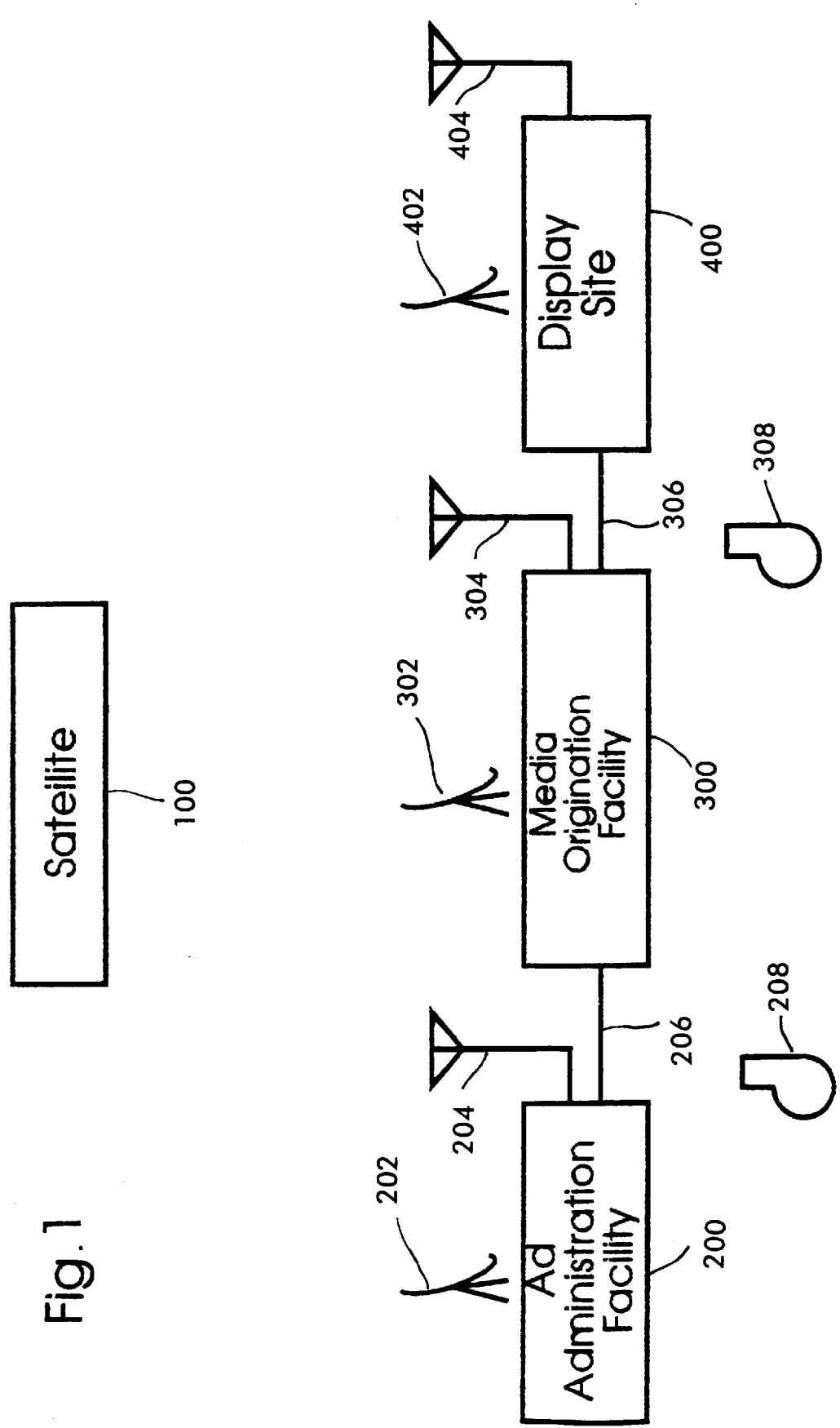

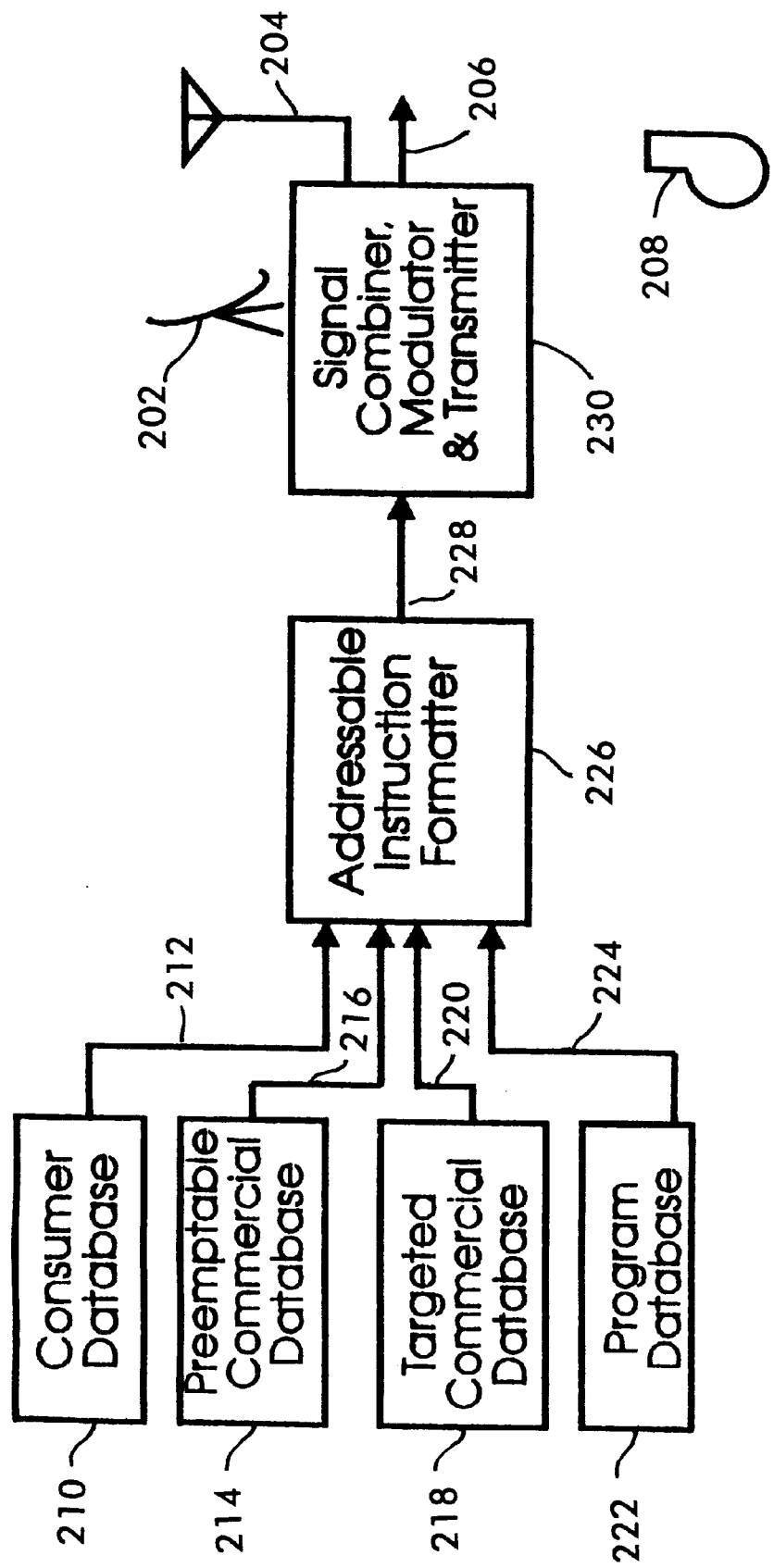

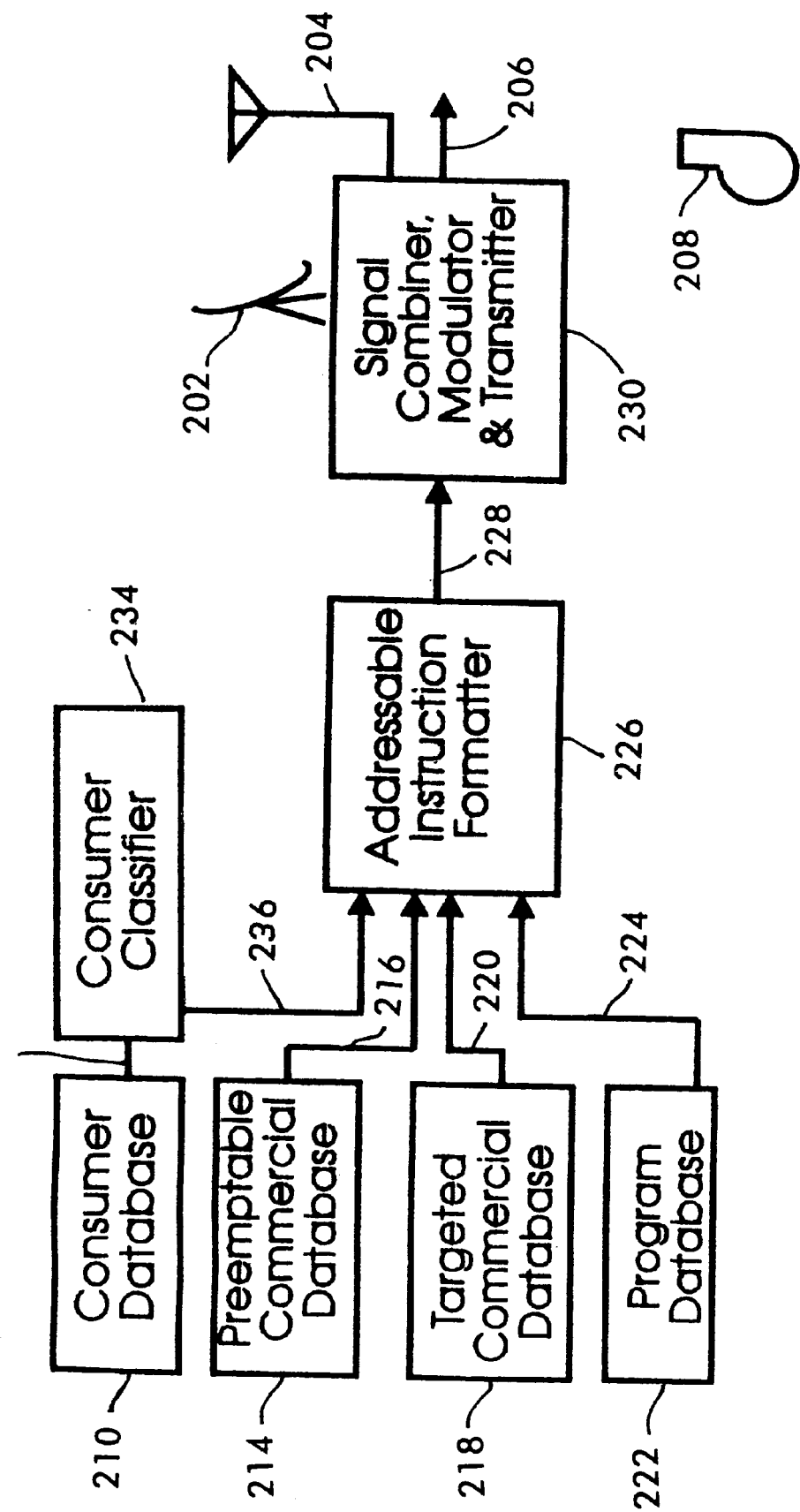

SYSTEM AND METHOD FOR DELIVERING TARGETED ADVERTISEMENTS TO CONSUMERS USING DIRECT COMMANDS

BACKGROUND OF THE INVENTION

This invention relates to an electronic system and a process for enhancing advertising by delivering TV and radio commercials targeted to individual viewer's based desires and needs.

TV has been dominated by the broadcast networks which were the best available means of broad reach for advertisers. Now, however, the world is changing with 67% of U.S. homes wired for cable. Thus, cable systems are effectively replacing on-air broadcast as the actual delivery vehicle for programs.

Broadcast networks and their affiliates however, still receive the vast majority of advertiser dollars for two reasons. First, advertisers believe that placing their commercials in specific programs will ensure that they reach the right kind of viewers. Advertisers however are aware that demographic targeting is highly wasteful. For example, dog owners comprise only 30% of households, thus every Ralston-Purina commercial exposure involves 70% waste.

Target marketing is the answer. Deliver your commercial to only those who are the best prospects.

The second reason broadcasters receive the majority of advertising revenue is because they continue to attract the largest audience (approximately 60% of all viewers) despite the proliferation of cable channels which has fragmented the viewing audience. The likelihood that viewers are watching any particular commercial/advertisement is reduced by the sheer quantity of channels. Advertisers have difficulty setting values on the advertising opportunities.

Advertisers are faced with an even more aggravating situation with the advent of Digital Video Compression (DVC). DVC means that the number of programs which can be carried by any digital media will expand dramatically.

The operators of delivery systems with large capacity are frustrated by the inability to interest advertisers in any significant amount of participation. It is very difficult to demonstrate the effectiveness of advertising in an environment of a hundred or more channels of advertiser supported programming.

While a number of such systems and processes are known in this art, none of these systems and processes deal with a way to provide specific commercials to viewers needs and wants in a multichannel environment.

It would be desirable to have a system for targeting commercials to those particular consumers who represent only the best prospects for an advertiser.

SUMMARY OF THE INVENTION

Accordingly, it is an object of this invention to provide a system and process which will solve the problems described above and overcome the disadvantages associated with the prior art systems described above.

It is another object of the present invention to provide viewers with advertisements which are matched to the viewer's interests and needs.

It is another object of the invention to provide such a system and process which will provide advertisers with less waste and greater cost effectiveness in delivering their messages only to those consumers who are desirable prospects.

It is a further object of the invention to provide such a system and process which will allow the operators of video delivery systems to increase the effectiveness of their media in delivering meaningful messages to consumers.

It is another object of the invention to provide a means of dealing with the clutter resulting from hundreds of channels of video and audio programming containing advertising.

The attainment of these and related objectives may be achieved through use of the novel electronic systems and processes herein disclosed.

The process of this invention includes the following steps. The sets of advertisements are prepared so that they are suitable for the transmission and storage means employed. Each commercial is analyzed as to its nature and focus and catalogued in a central data base. The messages are then delivered to the point of usage.

Commercials may be classified into three categories: 1) non-preemptable, 2) conditionally preemptable, or 3) unconditionally preemptable. For example, commercials in programs not participating in this system and process would be non-preemptable. Some commercials in programs which are eligible for preemption may also be non-preemptable under some circumstances. These are called conditionally preemptable. An example of such a situation may be that a competitor's product may not be used to preempt. One brand of automobile may be precluded from substituting for another brand of automobile. An unconditionally preemptable commercial may be subject to substitution any time other higher priority commercials are available. In locations not equipped with hardware which implements this system and process, the preemptable commercials are displayed.

Commercials which are subject to preemption are scheduled to be imbedded in programs. The details concerning the commercial's timing and where it will be found by the viewer's channel selector are stored in a central data base along with information to indicate under what circumstances a more suitable commercial may be substituted.

A suitable process is used to target prospective viewers of a set of advertisements using database search and list selection procedures. The result of this process is a database which characterizes each subscriber according to which commercials are best targeted to that subscriber.

In two way broadband systems, it is possible to implement and up stream reporting capability where signals are transmitted from the viewing location to a central database location for reporting whether a specific viewing location had its receiving equipment powered and tuned to a specific channel. This information can be used to further target the commercials. In situations where the broadband network is not capable of sending messages back to the central database, other means can be provided. An example of such means is an auto dialer device which accumulates the information and then at appropriate times dials a number and reports the accumulated data. The number dialed could be a local number or a "toll free 800" number. The reporting call can me made in a manner which first test to see if the phone line is in use and thereby ensures that calls in progress will not be interrupted. If someone in the home wishes to use the phone, this can be sensed and the report suspended and the phone line relinquished so that another call can be made. The interrupted data transmission would be completed later. In this manner, the use of an auto dial reporting capability can be accomplished without intrusion on the normal use of the telephone line.

A frequency feature can implemented by keeping track of the number of successfully displayed commercials by using the up stream reporting capability described above. A successful display of the commercial requires the display device to be in its "on" condition. An advertiser can then be assured that his commercial has been displayed on powered equipment at the subscriber's location at least the number of times specified in his contract. If the number is not achieved, perhaps because the receiving equipment is not powered, an appropriate adjustment with the advertiser can be made.

A sequencing feature can be implemented by keeping track of which commercials were displayed by using the up stream reporting capability described above. By having a sequencing feature, viewers would see a series of commercials in correct order. One commercial builds on another. Two examples of commercials requiring sequencing are tutorials and commercials including a story line which plays out in a determined sequence.

A viewer reaction feature can be included to cause additional relevant commercials to be presented in reaction to a viewer's response to questions or other viewer interaction transmitted using the up stream reporting capability described above. The relevant commercials could be for more detailed information about the same product or service. Alternatively, they could be for products or services which are likely to be of interest to the viewer based on the viewer's responses. For example, a viewer who requests more information about children's aspirin may also be offered a subsequent commercial on children's chewable vitamins.

A registration feature could be implemented by directing the receive site to store data for later communication using the up stream reporting capability described above. When such a commercial is successfully displayed, a confirmation is communicated back upstream to the signal origination site. A time and date stamp is added. Two levels of registration are possible. In the simpler level of registration, a count is accumulated at the origination point or some other suitable place indicating the total number of commercials successfully displayed at all locations. Viewer identities are not tabulated. In the second level of registration, a viewer identification number is included in the acknowledgment messages centrally collected. This second method is called a certification feature. In the case of certification, the viewer responds to the advertisement. This response could be to answer a question, to merely make an acknowledgment, or to request a coupon or other item of value. This indicates that not only has the commercial been successfully displayed, but it has also been viewed, recognized, and acted upon.

There are several options for the upstream transmission of registration or certification codes. This code could be transmitted upstream at the time the commercial was successfully received. Alternatively, the fact that it was received could be stored at the receive site and relayed to the signal origination site upon request or at a pre-programmed more convenient time. Several options for upstream communication exist. These include two-way cable systems, radio transmissions, telephonic communication, or the physical conveyance of a printed report, a magnetic, optical, electronic or other recorded report.

In summary, with the present invention, television (and radio) and advertising are enhanced by targeting, delivering and displaying electronic advertising messages (commercials) within specified programming in one or more pre-determined households (or on specific display devices) while simultaneously preventing a commercial from being displayed in other households or on other displays for which it is not intended. Commercials can be delivered to specified homes or displays via either over-the-air broadcast or wired delivery systems. The preferred embodiments are described below.

In a first preferred embodiment of the system and process in accordance with the invention, an individually addressable digital recording device (RD) with a unique address is installed at the display site in the television or radio receiver, VCR, display device or set-top-box or modular decoder associated with the media provider (cable, DBS, telephone, etc.). One or more instructions are transmitted to and recorded by the RD in advance of the commercial broadcast. These instructions will be used to "tell" the display which upcoming commercials to play and which to ignore.

These data transmissions to the home can be delivered via communications capabilities established with the program delivery system including but not limited to the Vertical Blanking Interval (VBI) of analog video, ancillary subcarriers, amplitude modulation of the frequency modulated audio carrier, totally separate data carriers, or using the digital equivalent of these means of a contracted or affiliated programming service.

Multiple commercials are simultaneously broadcasted in a television or radio commercial spot. For instance, rather than broadcasting one 30-second commercial, a number of commercials might be broadcasted simultaneously over different separate channels. Note that these simultaneously broadcasted commercials could be compressed in a digital transmission to fit within the distribution bandwidth as necessary. In any event, there would always be one of the number of commercials designated or chosen as a default commercial that would play unless replaced by a targeted commercial. Depending on the capacity of the transmission system, the number of simultaneous commercials could be relatively small—such as four or five (4 or 5)—or much larger.

A Commercial Processor (CP) at the display site would be programmed by an algorithm transmitted to the RD prior to the commercial transmission to look for and display targeted incoming commercials.

Display of a targeted commercial is accomplished by tuning to the frequency which contains the targeted commercial and, if it is digitized, selecting the correct digital data stream. In order to avoid subscriber confusion, the channel indicator does not change during the display of the targeted commercial. It remains on the channel previously being watched. After the targeted commercial is completed, the tuner returns to the frequency previously used for the program being watched.

In summary, in this preferred embodiment of the system and process in accordance with the invention, the commercials are simultaneously transmitted. The channels with the programming include default preemptable or conditionally preemptable commercials. The CP at the display site responds to instructions previously downloaded to it during the commercial period and implements the targeted commercial strategy appropriate for the viewer.

An anti-zapping feature may be employed. "Zapping" is the practice of skipping over commercials in a video tape or switching to another channel during a commercial to avoid the commercial. There have been many attempts to make circuits to automatically pause a VCR during commercials so that they are not recorded at all. It is important that the downloaded instructions be in an encrypted form to prevent commercial zappers from identifying the time of commercials and preventing their recording or viewing. If this is not done, boxes which prevent commercials from being recorded on VCRs will be available for sale in short order.

In a second preferred embodiment of the system and process in accordance with the invention, an individually addressable digital recording device (RD) with a unique address is installed at the display site in the television receiver, VCR, display device set-top-box or modular decoder associated with the video provider (cable, DBS, telephone, etc.). Commercial display instructions for a particular display site (consumer) are transmitted to and stored in an in-home storage device at the display site. These instructions include details about which commercials which will be later transmitted are to be captured and which are to be ignored. Commercials are subsequently transmitted to the in-home storage device with sufficient capacity to hold one or more commercials prior to display. The commercials could be in analog form, but it is more efficient of transmission and storage capacity to digitize and compress the commercials prior to transmission and storage.

The frequency, sequencing, registration, and certification features could be applied as in the first preferred embodiment.

In summary, in the second preferred embodiment, predetermined instructions are transmitted to the display site and stored therein, commercials are then sequentially transmitted to the display site prior to the time of their intended use. Appropriate storage is provided at the display site to store one or more of the commercials as appropriate for the display site, selected by following the previously transmitted instructions. If storage for multiple commercials is provided, they are downloaded and used appropriately.

In a third preferred embodiment of the system and process in accordance with the invention, the commercials are delivered in a switched video on demand (VOD) system. In a VOD system, consumers request programming which can begin at any time. The programming comes from massive storage systems called servers. Those servers supply signals to switches which rout the requested video to the individual display device. The commercial choice switched to that location is based on instructions transmitted from the central database.

In a fourth preferred embodiment of the system and process in accordance with the invention, the channels with preemptable and conditionally preemptable commercials are synchronized at the signal origination source so that enhanced advertising can be inserted independent of which program is being watched. This makes enhanced advertising particularly valuable. Not only is the commercial selected to fit the needs and wants of the viewer, but these more interesting commercials can be made to appear on a variety of programs. The consumer becomes more reachable even in an environment consisting of hundreds of channels. This invention can cost effectively implement a comprehensive version of the "Road Block" technique used in broadcast television where the same commercial is simultaneously placed on all networks. If the viewer changes channels to another channel with a preemptable commercial, the commercial is uninterrupted even though the channel indicator changes and indicates the new channel. Even if the viewer changes to a channel with non-preemptable commercials, the commercial already started could be completed before switching to the new channel. The advertisement is thus "locked up" in the program of the newly selected channel. This embodiment can be combined with any of the previous embodiments.

The appropriate instructions for each viewer are selected by a marketing organization which accumulates data on viewers to determine the commercials most appropriate to their individual needs and wants. These instructions are then transmitted individually to each viewing site and stored there for use by the CP. As the situation of the viewers changes, the instructions appropriate to those viewers also changes. For example, as children are born, certain products and services are of interest. As the children grow and mature, products and services previously interesting are replaced with those appropriate for older children.

The apparatus at the viewing site can store and process IDs for multiple individuals at the viewing site. When the viewer identifies himself or herself either directly or indirectly, the commercials appropriate to that individual are presented.

BRIEF DESCRIPTION OF THE DRAWINGS

The attainment of the foregoing and related objects, advantages and features of the invention should be more readily apparent to those skilled in the art, after review of the following more detailed description of the invention, taken together with the drawings, in which:

FIG. 1 is a basic block diagram of the system;

FIG. 2.a is a block diagram of the Advertisement Administration Facility;

FIG. 2.b is a block diagram of the Advertisement Administration Facility including a Consumer Classifier;

DETAILED DESCRIPTION OF THE PREFERRED EMBODIMENTS

Figure 3:
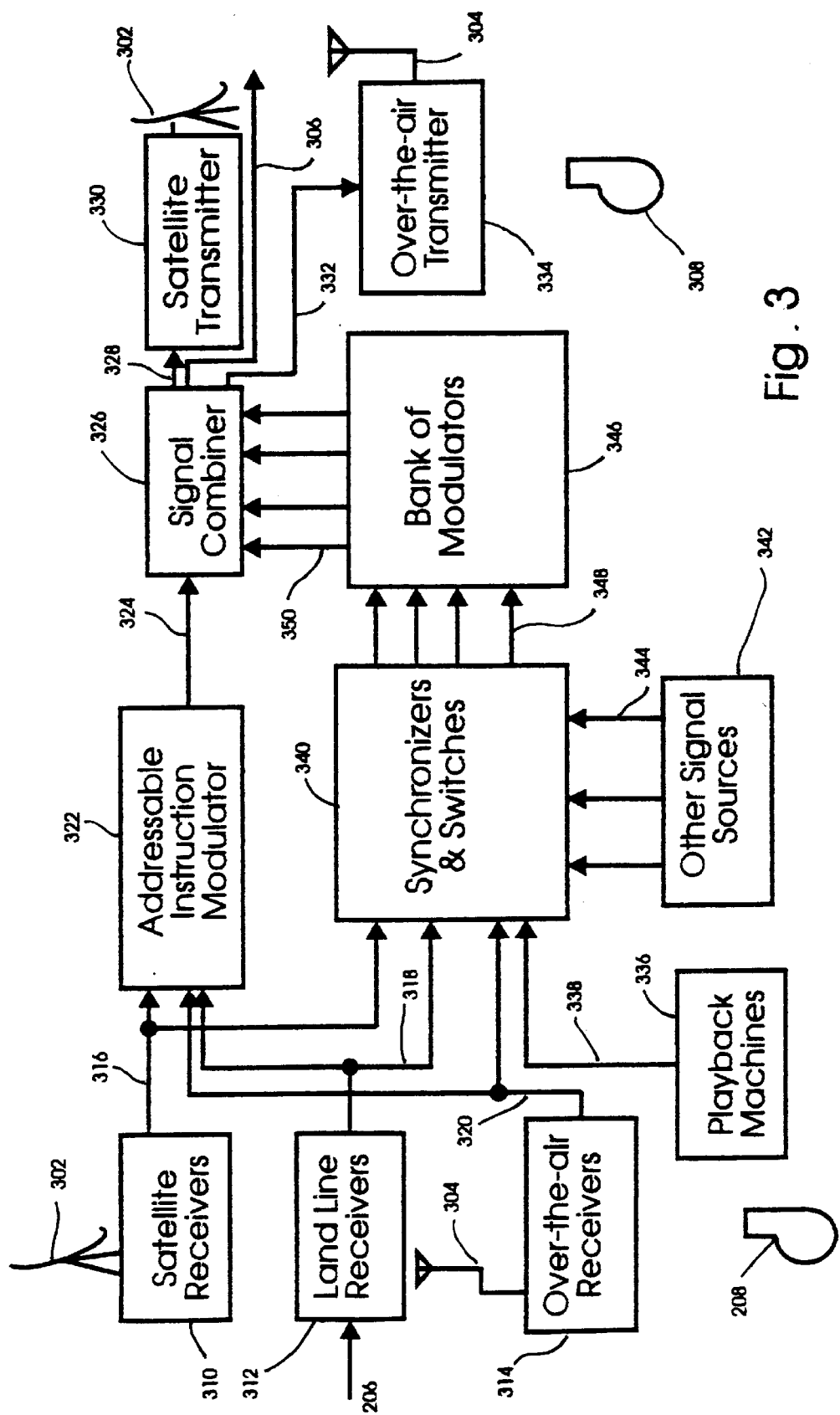
FIG. 3 is a block diagram of the Media Origination Facility.

Turning now to the drawings, more particularly to FIG. 1, there is shown a block diagram of the overall system. The Ad Administration Facility 200 is where customers, commercials, and programs are analyzed and categorized and the results stored in databases. The information from these databases is used to construct instructions governing the display of targeted commercials which will be transmitted to display sites.

The Ad Administration Facility 200 distributes the targeted commercial display instructions to a plurality of Media Origination Facilities 300 via satellite 100 using the uplink antenna 202 and the downlink antennas 302. Alternatively, for Media Origination Facilities in close proximity, antenna 204 can be used to transmit some or all of the targeted commercial display instructions to antennas 304 at Media Origination Facilities. An electrical and/or optical link 206 could be used as well as physical conveyance of the targeted commercial display instructions by physical means 208 such as optical or magnetic tapes or disks or other suitable means. The Media Origination Facility 300 also receives programming and commercials from other sources and creates some programming and commercials in its own facilities.

The package of programming and processed commercials and targeted commercial display instructions is conveyed to the display site 400 (reception site) via electrical and/or optical links 306, or radio transmission via antenna 304 and 404, or via satellite 100 and antennas 304 and 404, or even via physical means 308 such as optical or magnetic tapes or disks or other suitable means.

In some situations, one or more of the facilities 200, 300, and 400 may be co-located simplifying the transmission requirements for the processed commercials and targeted commercial display instructions.

FIG. 2 is a more detailed block diagram of the Ad Administration Facility 200 of FIG. 1. The Ad Administration Facility is where the characteristics of those viewing or hearing the commercials are analyzed and categorized and the results stored in a Consumer Database 210. Commercials suitable to the needs and wants of those viewing or hearing programming are also categorized and the results of this analysis stored in the Targeted Commercial Database 218. Information on commercials which can be preempted is stored in a Preemptable Commercial Data Base 214. Programming is also analyzed and categorized to determine the suitability of insertion of different categories of commercials. The results of this analysis is stored in a Program Database 222. The Consumer Database 210 contains lists of consumers who would be viewing or listening to programming and would be served by commercials which match their needs and wants based on the systems and process of this invention. This list is supplied by agencies which have gathered data on the consumers and have created algorithms for determining which commercials are most appropriate for those consumers. The combination of the algorithms and the data yield the instructions for targeting commercials to be used at the Display Site 400 of FIG. 1. The specific nature of the data collected and the algorithms varies with the creativity and resources of the advertising agencies using this invention. It should be clear to those skilled in these arts that there is a wide variety of combinations of data sets and algorithms which could be used with this invention. Neither the data set nor the algorithm are a part of the invention.

The Programming Database 222 contains lists of programs which would be suitable and eligible for use with commercials which match the needs and wants of consumers in the Consumer Database 210. This programming contains Preemptable Commercials as listed in the Preemptable Commercial Data 214.

To prevent the zapping of commercials, all commercial targeting instructions can be scrambled or encrypted in a manner which makes them indistinguishable from one another using means well known in the computer and communications arts.

The data in the Consumer Database 210 is conveyed by connection 212 to the Addressable Instruction Formatter 226 of FIG. 2. The data in the Preemptable Commercial Database 214 is conveyed by connection 216 to the Addressable Instruction Formatter 226 of FIG. 2. The data in the Targeted Commercial Database 218 is conveyed by connection 220 to the Addressable Instruction Formatter 226 of FIG. 2. The data in the Program Database 222 is conveyed by connection 224 to the Addressable Instruction Formatter 226 of FIG. 2. The Addressable Instruction Formatter then prepares detailed instructions for each subscriber so that each subscriber will view commercials determined to be of interest and utility to that subscriber. The methods of this invention described later are used to implement these functions. The Addressable Instruction Formatter 226 conveys its results via connection 228 to a Signal Combiner, Modulator and Transmitter 230 which relays these instructions to the Display Site, 400 of FIG. 1. These signals may be conveyed via wire line 206 comprising coaxial cable, fiber optics, or copper wire or some combination of these, or via over-the-air radio links using antenna 204, or via a satellite link using satellite antenna 202.

FIG. 2.b is similar to FIG. 2.a in most respects except rather than preparing detailed instructions for each subscriber, the subscribers (or consumers) are divided into classes. The Consumer Database 210 conveys subscriber details via connection 232 to the Consumer Classifier 234. The Consumer Classifier assigns consumers to a limited number of classes depending on their characteristics. The criteria for making these classifications is expected to differ from advertising agency to agency. The more correct the classification, the more successful will be the commercial targeting. The Classes of consumers are then conveyed via connection 236 to the Addressable Instruction Formatter 226. The method of FIG. 2.b significantly reduces the data transmission requirements. Rather than requiring detailed Commercial targeting information for each subscriber, only information about which commercial is targeted to which class of subscriber need be conveyed to the Display Site 400 of FIG. 1. At some convenient time, each subscriber receives data making an assignment to one or more classes. Under some circumstances, all of the signals that would have normally been delivered via satellite or conveyed by electrical and/or optical connection are recorded on some suitable media 208 and physically delivered to the Media Origination Facility 300 of FIG. 1.

FIG. 3 is a more detailed block diagram of the Media Origination Facility 300 of FIG. 1. Signals are received from the Ad Administration Facility 200 of FIG. 1 and from other sources via Satellite 100 to Satellite Antenna 302, conveyed by electrical and/or optical connection 206, and by physical distribution means 208. If the signals arrive via the Satellite Antenna 302 they are tuned and demodulated by Satellite Receiver 310, and conveyed by electrical and/or optical connection 316 to the Addressable Instruction Modulator 322 where they are put in an appropriate form for transmission to the Display Site 400 of FIG. 1. The Addressable Instruction Modulator may be of any type commonly used for the transmission of data in broadband systems. Included are Quadrature Amplitude Modulated (QAM) systems, Amplitude Modulated systems, Frequency Modulated Systems, or Phase Modulated Systems. If the signals arrive via the electrical and/or optical connection 206, they are tuned and demodulated by Land Line Receiver 312 and conveyed by electrical and/or optical connection 318 to the Addressable Instruction Modulator 322. If the signals arrive via physical means 208, the Playback Machine 336 is used to convert them into electrical signals and they are conveyed by electrical and/or optical connection 338 vial Synchronizers & Switches 340 to the Addressable Instruction Modulator via connection 316. If the signals arrive via the over-the-air radio spectrum via antenna 304, the Over-the-air Receivers 314 will convert them to usable form and the signals will be conveyed via connection 320 to the Addressable Instruction Modulator 322. A wide variety of other programs and signals are received by the satellite antenna 302 and Satellite Receivers 310 and Land Lines 206 and Land Line Receivers 312 and antenna 304 and Over-the-air Receivers 314 and physical means 208 and Playback Machines 336. These signals are conveyed by connections 316, 318, 320 and 338 to the Synchronizers and Switches 340 where they are mixed and time synchronized along with signals from Other Signal Sources 342 conveyed by connections 344. The Synchronizers & Switches 340 prepare the signals and convey them via connections 348 to a Bank of Modulators 346 which put the signals into separate frequency channels so that they may be tuned at the Receive Site 400 of FIG. 1. The modulated signals are conveyed via connections 350 to a Signal Combiner 326 where they are combined with each other and with the Addressable Instructions which will direct the Receivers at the multiple display sites in the correct manner to target the commercials to subscribers. The combined signal from the Signal Combiner 326 may be directly conveyed via connection 306 to Display Sites 400 of FIG. 1. Alternatively, the combined signals from the Signal Combiner 326 may be conveyed via connection 328 to a Satellite Transmitter 330 which prepares these signals for a Satellite Antenna 302. They are then delivered via Satellite 100 of FIG. 1 to Display Site antennas 402 of FIG. 1. Alternatively, Over-the-air Transmitter 334 can drive an antenna 304 to deliver the signals over the air to a plurality of Display Sites 400 of FIG. 1. The signals can optionally be distributed by physical means 308.

Other programming and preemptable commercials are generated locally and is received via satellite, fiber, coaxial cable, twisted pairs, and other means and is represented by the Other Signal Sources block 342.

Figure 4:
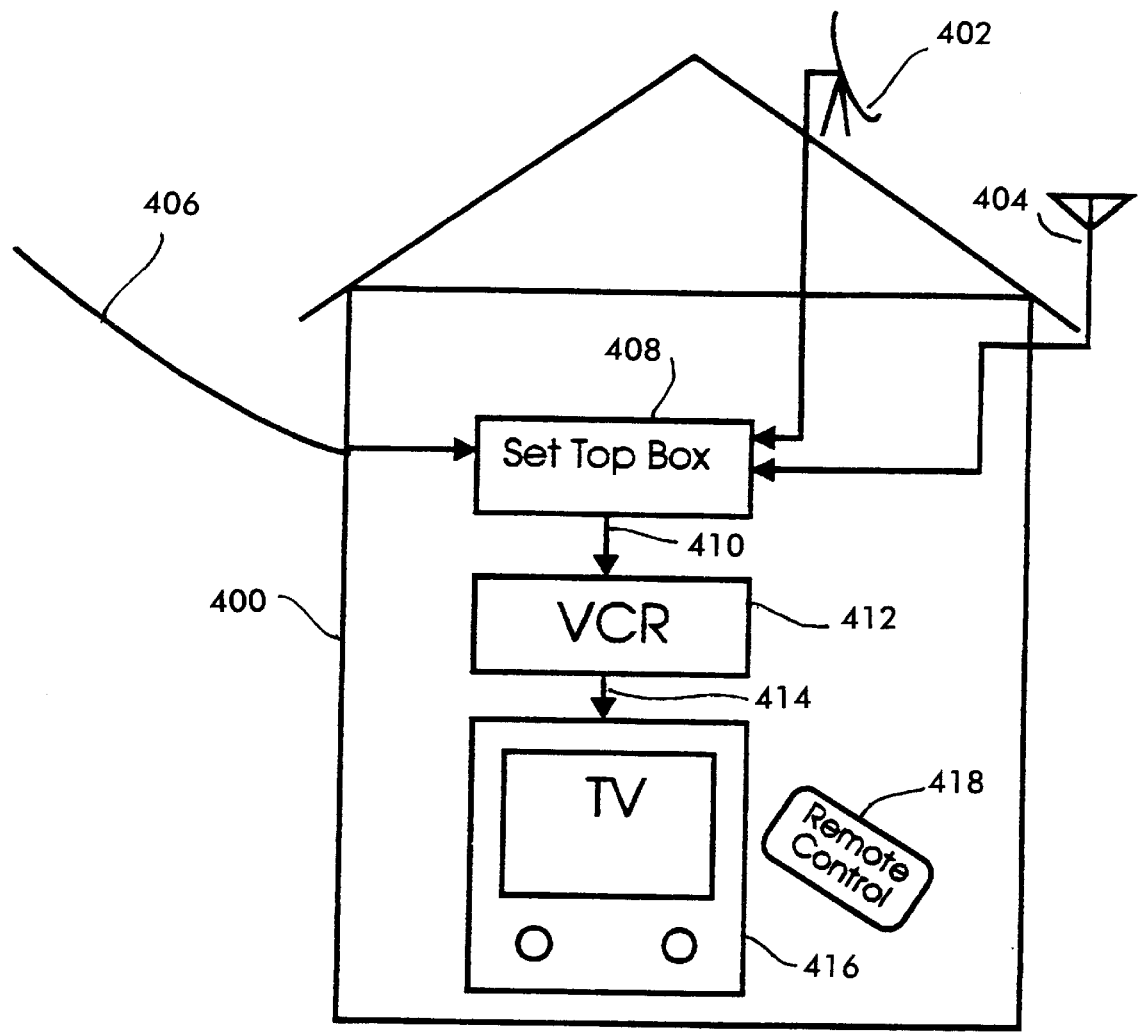
FIG. 4 is a block diagram of the Display Site.

FIG. 4 is a more detailed block diagram of the Display Site of FIG. 1. Signals are conveyed by electrical and/or optical connection 406 and/or by radio via antenna 404 and/or via satellite via satellite antenna 402 to a receiver illustrated in FIG. 4 by a Set Top Box 408. Optionally, physical media 308 could be used within an Optional Playback Device illustrated in FIG. 4 as VCR 412. Set top box 408 typically connects via a radio frequency connection 410, typically at television channel 3 or 4 to the antenna terminals or cable input of VCR 412. VCR 412 is connected via either a radio frequency link or a baseband audio and video link, either is designated in FIG. 4 as 414 to a television receiver 416.

Figure 5:
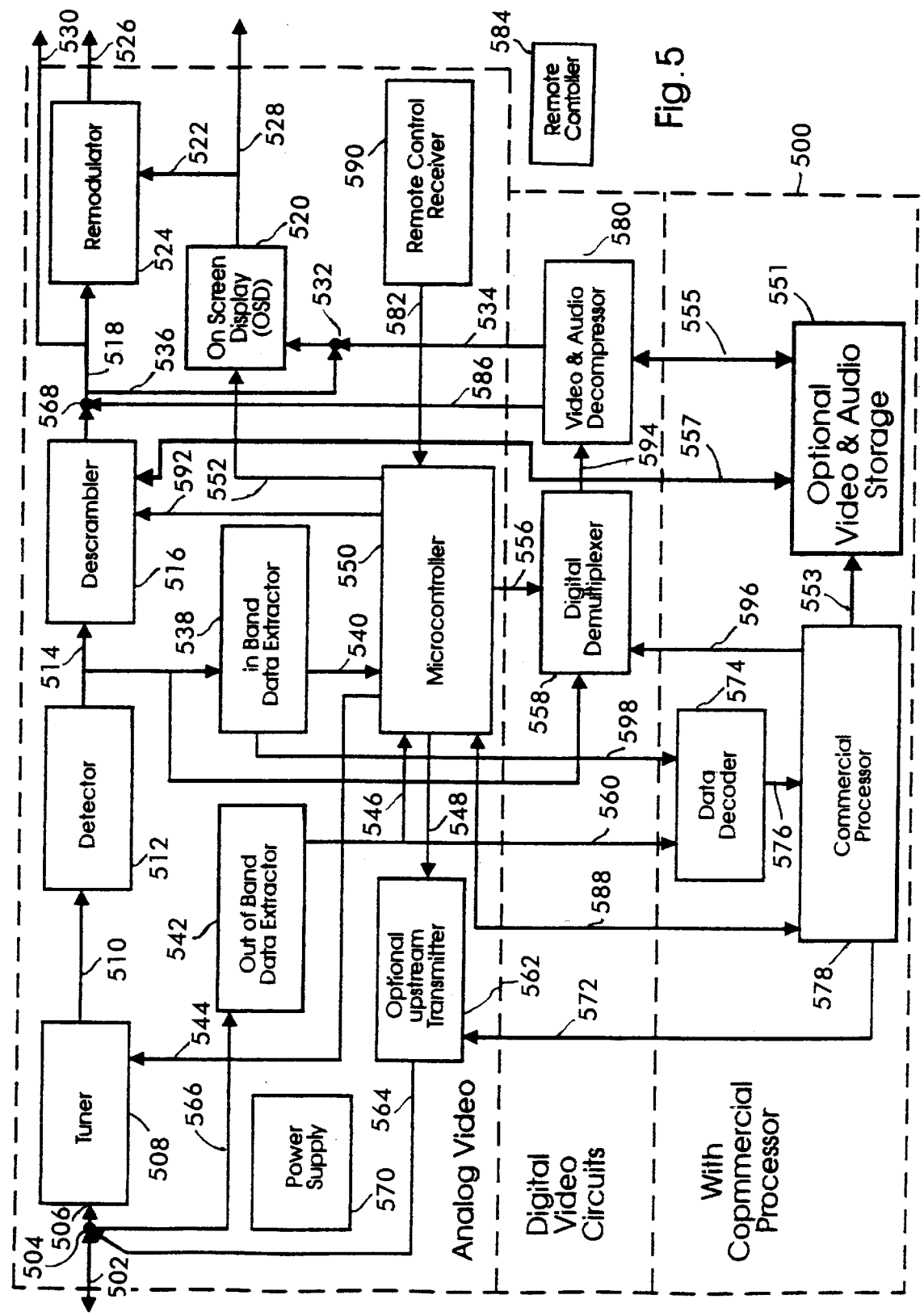
FIG. 5 is a block diagram of a set top box implementation of the invention.

FIG. 5 is detailed diagram of a set top box as is commonly used in the cable industry to compensate for consumer electronics tuner deficiencies and to add new services and features such as descrambling, electronic program guides, on screen displays, interactivity, multimedia, etc. This is one proper mechanism for adding the capability to practice the present inventions. A broadband signal carrying many channels is conveyed by electrical and/or optical connection 502 from the service provider to the subscriber. The signal is first introduced to combiner 504 which adds in an optional upstream signal and splits off an optional signal for the Out-of-Band-Data Extractor 542. The signal is conveyed by electrical and/or optical connection 506 to a Tuner 508 which selects one frequency band out of the available spectrum. In typical cable practice, a 6 MHz piece of spectrum is selected out of a range of 50 MHz to commonly 750 MHz and in a few instances 1,000 MHz. This piece of spectrum is called a channel and is conveyed by electrical and/or optical connection 510 to a Detector 512. The Detector 512 converts the signal from a modulated form to baseband with frequencies extending from zero to around 4.2 MHz. The operation of Tuners such as 508 and Detectors such as 512 are well known to those skilled in the radio and television arts. The signal is then conveyed by electrical and/or optical connection 514 to Descrambler 516 and In-Band Data Extractor 538 and digital Demultiplexer 558. The Descrambler 516 descrambles signals for authorized subscribers under the control of signals conveyed by electrical and/or optical connection 592 from Microcontroller 550. The descrambled audio signals are conveyed by electrical and/or optical connection 518 to a Remodulator 524 which combines the descrambled video signals which have first been conveyed to a Combiner 568 before being conveyed by electrical and/or optical connection 536 to an On Screen Display Generator 520. The descrambled video combined with optional on screen display signals is then conveyed by electrical and/or optical connection 522 to the Remodulator 524. The Remodulator 524 prepares the signals for use by ordinary TVs or VCRs at a convenient channel, such as channel 3 or 4, which is unused locally off-air. The on screen display generator 520 is used by various services to create messages which assist the subscriber in their use. Microcontroller 550 provides the information required by the On Screen Display Generator 520 to assemble the messages via signals conveyed by electrical and/or optical connection 552.

Optionally, the audio signal from Descrambler 516 and the video signal from On Screen Display Generator 520 can be conveyed by electrical and/or optical connection 528 and 530 respectively to TVs or VCRs which have baseband video and audio inputs.

Service provided over broadband media frequently contain either in-band data or out-of-band data or both. In band data is sometimes used for signal security purposes where it is necessary to assure that the data and the video are related. This method modifies some characteristic of the signal to carry this data. A common method is to put data in the Vertical Blanking Interval of the video signal. That is the portion of the signal which carries no video since the picture tube's electron beam is retracing its path back up to the top of the screen. Out of band data is used when the receiving device needs to be in constant contact with the data source independent of which channel is being viewed or recorded. Out of Band data can have higher speed and capacity. In some cases, a combination of both in-band data and out-of-band data are used as a security measure. The In-Band Data Extractor 538 receives detected signals from the channel selected by the Tuner 508 and demodulated to baseband frequencies by Detector 512 and conveyed by electrical and/or optical connection 514. The extracted data is conveyed by electrical and/or optical connection 540 to the Microcontroller 550. The out-of-band data is conveyed by electrical and/or optical connection 566 from combiner 504. It is converted to a usable form by Out-of-Band Data Extractor 542 and conveyed by electrical and/or optical connection 546 to the Microcontroller.

In a two way cable system, the Microcontroller 550 sends messages conveyed by electrical and/or optical connection 548 to the Optional Upstream Transmitter 562 which uses an appropriate modulation method and conveyed by electrical and/or optical connection 564 to Combiner 504 which then impresses these signals on the broadband connection 502 to the service provider. It is sometimes the practice to use another media for upstream communications if the broadband service provider doesn't have two-way capability. Examples include dial-up modems on telephone twisted pairs and appropriate radio transmitters. A low power, low bandwidth satellite up-link has also been considered.

The Microcontroller also receives consumer inputs from the IR Remote Control 584 to IR Receiver 590. These signals are conveyed by electrical and/or optical connection 582 to the Microcontroller 550.

If the signals are Digital Compressed Video and Audio, they are conveyed by electrical and/or optical connection 514 to Demultiplexer 558 which selects the desired data stream under the influence of control signals conveyed by electrical and/or optical connection 556 from the Microcontroller 550. The demultiplexed signals are conveyed by electrical and/or optical connection 594 to the Video and Audio Decompressor 580 where they are converted into baseband video and audio signals. If these signals are scrambled or encrypted, they are descrambled or decrypted here as well. The video signals are conveyed by electrical and/or optical connection 534 to the Combiner 532 which then are conveyed by electrical and/or optical connection to the On Screen Display Generator 520. The audio signals are conveyed by electrical and/or optical connection 522 to the Remodulator 524 and the optional audio output 530. Power Supply 570 provides the correct voltages and currents for the operation of all the circuits in the set top box.

The above describes the operation of an analog or digital set top box before the introduction of the technology of this invention.

Figure 6:
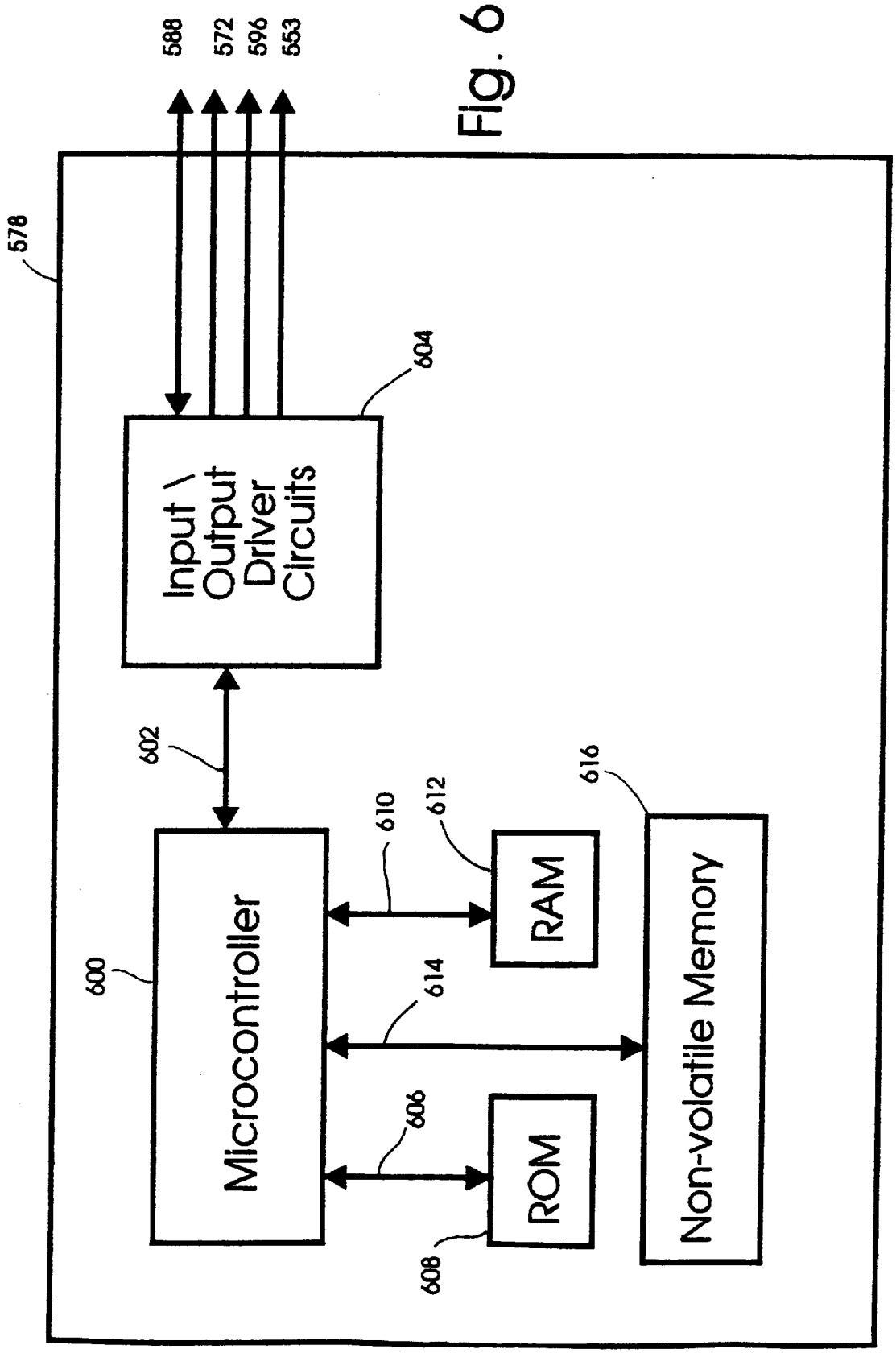
FIG. 6 is a block diagram of the Commercial Processor

FIG. 6 shows the detail of the Commercial Processor 578 of FIG. 5. The Commercial Processor 578 comprises a Microcontroller 600 supported with Input\Output Driver Circuits 604 connected via connection 602. In this application, only one of the lines 588 is bi-directional. Lines 572, 596, and 553 are output lines. All four of these lines are found in FIG. 5. Some of the program for the operation of Microcontroller 600 is held in Read Only Memory, ROM, 608 and conveyed via bi-directional connection 606 which queries memory locations and carries back program instructions. Additional programs and data are stored in Random Access Memory 612 connected to the Microcontroller 600 by connection 610 and Non-volatile Memory 616 connected to the Microcontroller 600 by connection 614. The advantage of Non-Volatile Memory 616 compared with RAM 612 is that it retains its data even when power is removed. The advantage of both Non-Volatile Memory 616 and RAM 612 compared with ROM 608 is that it can be changed. The advantage of RAM 612 over Non-volatile Memory 616 is that it is much more compact and less expensive and therefore more can be utilized for a given cost and size constraint. The advantage of ROM 608 over RAM 612 is that it is permanent and even more dense and less expensive than RAM 612. So each of these types of memory have their own advantages and disadvantages and must be utilized appropriately.

Returning to FIG. 5, in this first preferred embodiment multiple commercials are simultaneously delivered to the Display Site 400 of FIG. 1. One of these commercials, the default commercial, is embedded in the programming. The other commercials, the targeted commercials, are provided on other channels. The Commercial Targeting information is also delivered either via the Out of Band Data Extractor 542 through connection 560 to the Data Decoder 574 through connection 576 to the Commercial Processor or via the In Band Data Extractor 538 via connection 598 to the Data Decoder 574 via connection 576 to the Commercial Processor. The Commercial Targeting data contains information for each channel which has preemptable or conditionally preemptable commercials. The instructions are stored pertaining to where the replacement commercial can be found. If the commercials are digitally compressed, information about how to demultiplex the appropriate data from the stream in the proper frequency band must also be supplied.

It is possible to program the Commercial Processor 578 so that once a targeted commercial is begun, it is completed even though the viewer is switching channels. The channel indicator may change to show where the Tuner 508 will end up once the commercial is completed, but the commercial remains uninterrupted. This is an exceptionally powerful method of advertising which is particularly valuable in the environment of hundreds of channels. It may be necessary to allow for the commercial to change if the subsequently selected channel contains a non-preemptable commercial or one which is conditionally preemptable but whose conditions are violated.

In the second preferred embodiment, a cost effective Optional Video & Audio Storage Device 551 is anticipated. This device may consist of a variety of possible storage media including semiconductor, optical and magnetic. The storage medium may be static or dynamic such as rotating media or tape transported between spools in a cassette or cartridge. The commercials may be stored in analog or digital form. If stored in digital form, the commercials may be compressed to save capacity. A wide variety of such devices are under development for many other purposes. When such devices become economically practically, it will be possible to pre-store one or more commercials in these devices. Then when the correct time for a commercial arrives, it is simply played back. An Ad Queue is stored in Nonvolatile Memory 616 of FIG. 6 listing the contents of the Optional Video & Audio Storage device 551 This embodiment has the further advantage that it facilitates the substitution of targeted commercials in live events such as sports contests. In these situations, it may not be possible to time synchronize several channels of alternate commercials at arbitrary times without causing conflicts with normally scheduled preemptable commercials on regularly scheduled channels. However, the commercials of this implementation are available at the moment needed without concern for the timing on other channels.

It will be appreciated by those skilled in the Microcontroller arts that the Microcontroller 600 contained in Commercial Processor 553 as shown in FIG. 6 can be combined with the Microcontroller 550 of the set top box 500 of FIG. 5. Likewise, the function of the Data Decoder 674 of FIG. 5 can be combined with the functions of the Out-of-Band Data Extractor 542 and the In-Band Data Extractor 538. They are shown here as separate devices only for clarity of explanation.

Figure 7:
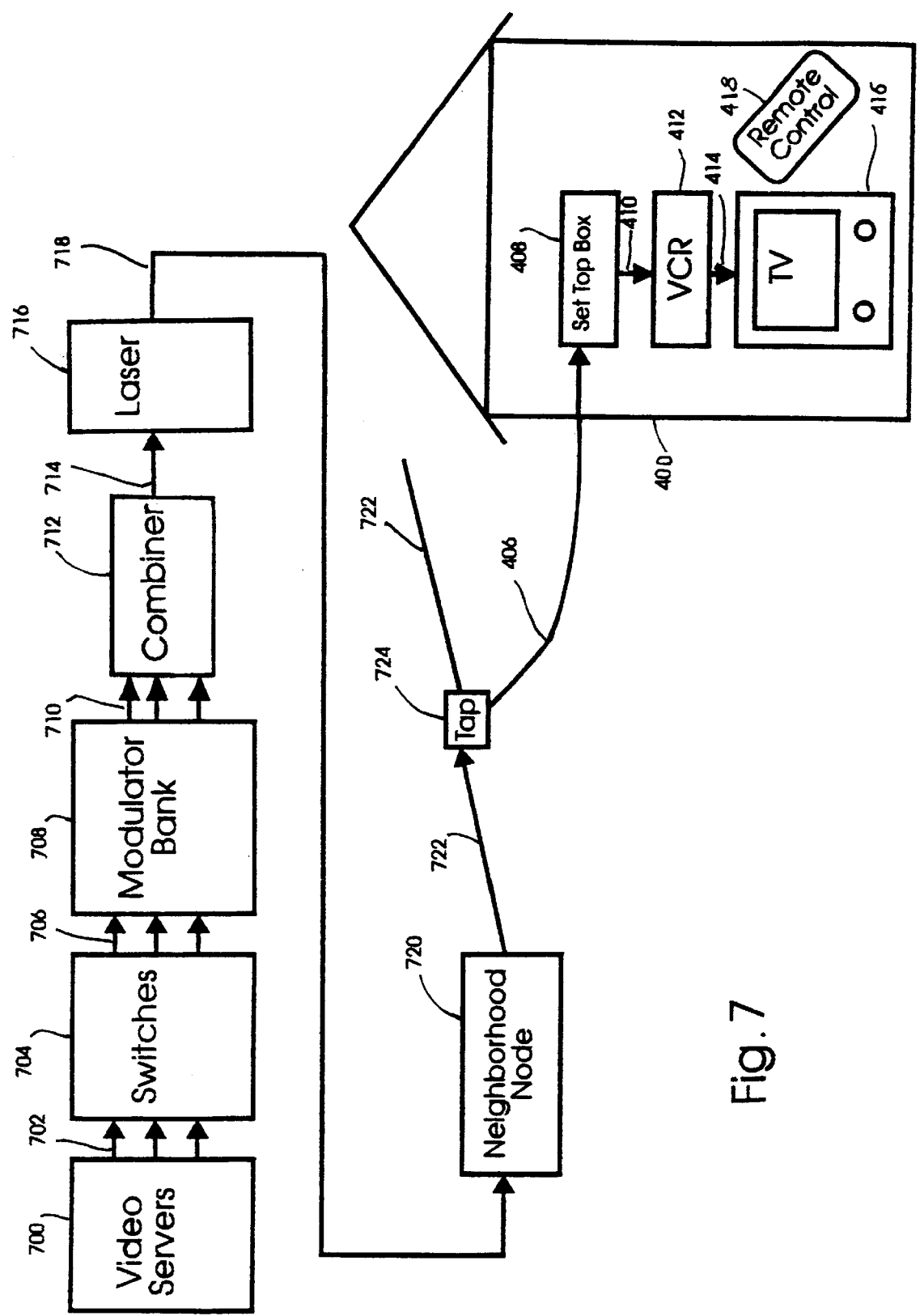
FIG. 7 is a block diagram of a Video On Demand system which implements the invention.

FIG. 7 is a detailed block diagram of a Video On Demand (VOD) system as is used in cable and other broadband video systems. This constitutes the third preferred embodiment of this invention. The VOD system comprises a bank of Servers 700 which store both programming and commercials in a form which allows rapid access. The currently employed storage media include but are not necessarily limited to semiconductor, optical, and magnetic media of either stationary or rotating or transported types. The servers 700 has a multitude of channels which convey by electrical and/or optical connections 702 the individual signal streams to a bank of Switches 704 which direct the correct signals to be conveyed by electrical and/or optical connections 706 to a bank of Modulators 708 which modulate these signals onto a variety of frequencies. The modulated signals are conveyed by electrical and/or optical connections 710 to a Combiner 712 which assembles a complete spectrum which is then conveyed by electrical and/or optical connection 714 to a Laser 716 of sufficient power to excite Optical Fiber 718 in a manner that produces adequate signals at the Neighborhood Node 720 which converts the signal to a frequency spectrum of electrical signals for transport on Coax 722 to a Tap 724 outside the subscriber's residence 400 which is connected by cable drop 406. A set top box 408 processes the signal for use by a VCR 412 and TV 416 under the subscribers influence via remote control 418. It will be appreciated that the Optical Fiber 718 could be extended all the way to the subscriber's residence 400 and even to his set top box 408 or TV 416 or VCR 412. In this embodiment, the Optional Video & Audio Storage Device 551 of FIG. 5 is not required. Nor are a multitude of additional channels for the transport of alternate commercials. Rather, when it is time for a commercial, the appropriate targeting instructions are delivered and as a consequence a request is issued upstream back to the Server 700, the Switches, 704, and the Modulator Bank 708 to play back and rout the appropriate commercial for reception at the subscriber's residence.

This embodiment has the further advantage that it facilitates the substitution of targeted commercials in live events such as sports contests. In these situations, it is usually not possible to time synchronize several channels. However, the commercials of this implementation are available at the moment needed without concern for the timing on other channels. The preferred embodiment of the invention involves supplementary electronics built into set-top boxes, consumer electronics products, personal computers, plug-in modules for the Decoder Interface of "cable ready" products, and other display devices. This electronics has the purpose of managing the display of special advertisements based on the needs and interests of the viewer.

Although the invention has been described with reference to preferred embodiments, it will be apparent to one skilled in the art that variations and modifications are contemplated within the spirit and scope of the invention. The drawings and description of the preferred embodiments are made by way of example rather than to limit the scope of the invention, and it is intended to cover within the spirit and scope of the invention all such changes and modifications.

What is claimed is:

1. A system for delivery of targeted advertisements from a head end system to individual consumers at at least one consumer display site comprising:
   (a) a control device at the at least one consumer display site; and
   (b) a controller at the head end system for sending a signal to the control device at the at least one display site for causing an advertisement to be displayed at said at least one display site intended for a particular consumer;
   (c) the controller at the head end system including a program database supplying program materials and a commercial database supplying advertisements for display at the at least one display site, the commercial database further storing information concerning the type of each advertisement; the head end system further including a consumer database having information about a consumer at the at least one display site, and an instruction formatter having inputs from the consumer database, the program database and the commercial database for generating an instruction for the control device at the at least one display site, the instruction being generated based on the type information stored in the commercial database and the information about the consumer at the at least one display site and optionally a characteristic of the program materials; the controller at the head end system further downloading the instruction to the control device at the at least one display site to command the control device to select an advertisement from the head end system intended for display at the at least one display site.

2. A system of claim 1 wherein an individually addressable digital recording device is installed at the consumer display site having a unique address, and further comprising a transmitter transmitting instructions to the recording device in advance of advertisement broadcast that will tell the display site which upcoming advertisements to play and which to ignore.

3. A system of claim 1 wherein a commercial processor is at the consumer display site to look for and display targeted incoming advertisements.

4. A system of claim 1 further comprising a circuit for preventing channel indicator from changing during the display of a targeted advertisement and after this advertisement is completed, the display site changes to the selected channel.

5. A system of claim 1 further comprising storage provided at the consumer display site for storage at the display site of targeted advertisements for later viewing at the display site.

6. A system of claim 1 including a central data base, a switched view on demand system including services that route advertisements to a consumer display site based on instructions transmitted from the central data base.

7. A system of claim 1 wherein a roadblocker is provided for simultaneously placing on all channels at the consumer display site the same targeted advertisement even though the consumer changes channel.

8. A system of claim 1 wherein a consumer classifier assigns consumers to a predetermined class of consumer for receiving a targeted advertisement intended for the class of consumers.

9. A system of claim 1 wherein an addressable instruction modulator receives the signal and places it in a form for transmission to the consumer display site.

10. A system for targeting advertisements from a head end system to consumers at at least one remote display site comprising:
    (a) a control device at the at least one display site;
    (b) a controller at the head end system for delivering a program and a plurality of advertisements to said control device at the at least one display site for display;
    (c) the controller at the head end system sending a command signal to the at least one display site for determining which advertisement is to be displayed at the display site while preventing the display of the remaining plurality of advertisements, the controller at the head end system including a program database supplying said program, a commercial database supplying said advertisement, the commercial database further storing information concerning the type of each advertisement; a consumer database having information about a consumer at the at least one display site and an instruction formatter having inputs from the consumer database, the program database and the commercial database for generating the command signal for the control device at the at least one display site, the command signal being generated based on the type information stored in the commercial database and the information about the consumer at the at least one display site and optionally a characteristic of the program; the controller at the head end system further downloading the command signal to the control device at the at least one display site to command the control device to select an advertisement from the head end system for display at the at least one display site.

11. A system of claim 10 wherein an individually addressable digital recording device is installed at the consumer display site having a unique address, and further comprising a transmitter transmitting instructions to the recording device in advance of advertisement broadcast that will tell the display site which upcoming advertisements to play and which to ignore.

12. A system of claim 10 wherein a commercial processor is at the consumer display site to look for and display targeted incoming advertisements.

13. A system of claim 10 further comprising a circuit for preventing a channel indicator from changing in response to viewer channel change requests during the display of a targeted advertisement and for preventing change of frequency after and this advertisement is completed, the display site changes to the selected channel.

14. A system of claim 10 further comprising storage provided at the consumer display site for storage at the display site of targeted advertisements for later viewing at the display site.

15. A system of claim 10 including a central data base, a switched view on demand system including services that route advertisements to a consumer display site based on instructions transmitted from the central data base.

16. A system of claim 10 wherein a roadblocker is provided for simultaneously placing on all channels at the consumer display site the same targeted advertisement even though the consumer changes channels.

17. A system of claim 10 wherein a consumer classifier assigns consumers to a predetermined class of consumer for receiving a targeted advertisement intended for the class of consumers.

18. A system of claim 10 wherein an addressable instruction modulator receives the signal and places it in a form for transmission to the consumer display site.

19. A system for targeting advertisements from a head end system to consumers at first and second display sites comprising:
   control devices at each of the first and second display sites;
   a controller at the head end system for delivering a program to said control devices at said first and second display sites having a plurality of predetermined breaks and a plurality of advertisements; and
   the controller at the head end system sending a command signal to the first display site for determining which of said plurality of advertisements is to be displayed at the first display site during a first break intended for a first consumer and simultaneously sending a command signal to the second display site for determining which of said plurality of advertisements is to be displayed at the second display site during said first break intended for a second consumer; the controller at the head end system including a program database supplying said program, a commercial database supplying said plurality of advertisements, the commercial database further storing information concerning the type of each advertisement; a consumer database having information about a consumer at each of the first and second display sites and an instruction formatter having inputs from the consumer database, the program database and the commercial database for generating said command signals for the control devices at the first and second display sites, the command signals being generated based on the type information stored in the commercial database and the information about the consumer at the at least one display site and optionally a characteristic of the program; the controller at the head end system further downloading the command signals to the control devices at the first and second display sites to command the control devices to select an advertisement from the head end system for display at the display sites.

20. A system of claim 19 wherein an individually addressable digital recording device is installed at the consumer display site having a unique address, and further comprising
   a transmitter transmitting instructions to the recording device in advance of advertisement broadcast that will tell the display site which upcoming advertisements to play and which to ignore.

21. A system of claim 19 wherein a commercial processor is at the consumer display site to look for and display targeted incoming advertisements.

22. A system of claim 19 further comprising a circuit for preventing a channel indicator from changing in response to viewer channel change requests during the display of a Road Block advertisement and for preventing changing of program data stream and after this advertisement is completed, the display site changes to the selected program data stream.

23. A system of claim 19 further comprising storage provided at the consumer display site for storage at the display site of targeted advertisements for later viewing at the display site.

24. A system of claim 19 including a central data base, a switched view on demand system including services that route advertisements to a consumer display site based on instructions transmitted from the central data base.

25. A system of claim 19 wherein a roadblocker is provided for simultaneously placing on all channels at the consumer display site the same targeted advertisement though the consumer changes channels.

26. A system of claim 19 wherein a consumer classifier assigns consumers to a predetermined class of consumer for receiving a targeted advertisement intended for the class of consumers.

27. A system of claim 19 wherein an addressable instruction modulator receives the signal and places it in a form for transmission to the consumer display site.

28. A system for targeting advertisements from a head end system to consumers at at least one consumer display site comprising:
   a control device at the at least one display site displaying a program having a break for displaying an advertisement;
   a controller at the head end system for delivering a plurality of advertisements to said at least one display site appropriate to a particular consumer; and
   the controller at the head end system sending a command signal for selecting one advertisement of said plurality of advertisements for display during said break appropriate for a particular consumer, the controller at the head end system including a program database supplying program materials, a commercial database supplying said plurality of advertisements, the commercial database further storing information concerning the type of each advertisement; a consumer database having information about a consumer at the display site and an instruction formatter having inputs from the consumer database, the program database and the commercial database for generating said command signal for the control device at the at least one display site; the command signal being generated based on the type information stored in the commercial database and the information about the consumer at the at least one display site and optionally a characteristic of the program materials; the controller at the head end system further downloading the command signal to the control device at the at least one display site to command the control device to select an advertisement from the head end system for display at the at least one display site.

29. A system of claim 28 wherein an individually addressable digital recording device is installed at the consumer display site having a unique address, and further comprising
   a transmitter transmitting instructions to the recording device in advance of advertisement broadcast that will tell the display site which upcoming advertisements to play and which to ignore.

30. A system of claim 28 wherein a commercial processor is at the consumer display site to look for and display targeted incoming advertisements.

31. A system of claim 28 further comprising a circuit preventing a channel indicator from changing in response to viewer channel change requests during the display of a Road Block and/or targeted advertisement while preventing changing frequency and/or data stream and after this advertisement is completed, the display site changes to the selected channel and/or program data stream.

32. A system of claim 28 wherein storage is provided at the consumer display site for storage at the display site of targeted advertisements for later viewing at the display site.

33. A system of claim 28 including a central data base, a switched view on demand system including services that route advertisements to a consumer display site based on instructions transmitted from the central data base.

34. A system of claim 28 wherein a roadblocker is provided for simultaneously placing on all channels at the consumer display site the same targeted advertisement even though the consumer changes channel.

35. A system of claim 28 wherein a consumer classifier assigns consumers to a predetermined class of consumer for receiving a targeted advertisement intended for the class of consumers.

36. A system of claim 28 wherein an addressable instruction modulator receives the signal and places it in a form for transmission to the consumer display site.

37. A system for targeting advertisements from a head end system to consumers at at least one consumer display site comprising:
 (a) a control device at the at least one display site;
 (b) a controller at the head end system sequentially delivering a plurality of advertisements to said at least one display site; and
 (c) the controller at the head end system sending a command signal for selectively displaying an advertisement of said plurality of advertisements, the controller at the head end system including a program database supplying program materials, a commercial database supplying said plurality of advertisements, the commercial database further storing information concerning the type of each advertisement; a consumer database having information about a consumer at the at least one display site and an instruction formatter having inputs from the consumer database, the program database and the commercial database for generating the command signal for the control device at the at least one display site; the command signal being generated based on the type information stored in the commercial database and the information about the consumer at the at least one display site and optionally a characteristic of the program materials; the controller at the head end system further downloading the command signal to the control device at the at least one display site to command the control device to select an advertisement from the head end system for display at the display site.

38. A system of claim 37 wherein an individually addressable digital recording device is installed at the consumer display site having a unique address, and further comprising
 a transmitter transmitting instructions to the recording device in advance of advertisement broadcast that will tell the display site which upcoming advertisement to display and which to ignore.

39. A system of claim 37 wherein a commercial processor is at the consumer display site to look for and display targeted incoming advertisements.

40. A system of claim 37 further comprising a circuit preventing a channel indicator from changing in response to viewer channel change requests during the display of a Road Block and/or targeted advertisement while preventing a tuner and/or digital demultiplexer from changing frequency and/or program data stream and after this advertisement is completed, the display site changes to the selected channel and/or program data stream.

41. A system of claim 37 further comprising storage provided at the consumer display site for storage at the display site of targeted advertisements for later viewing at the display site.

42. A system of claim 37 including a central data base, a switched view on demand system including services that route advertisements to a consumer display site based on instructions transmitted from the central data base.

43. A system of claim 37 wherein a roadblocker is provided for simultaneously placing on all channels at the consumer display site the same targeted advertisement even though the consumer changes channel.

44. A system of claim 37 wherein a consumer classifier assigns consumers to a predetermined class of consumer for receiving a targeted advertisement intended for the class of consumers.

45. A system of claim 37 wherein an addressable instruction modulator receives the signal and places it in a form for transmission to the consumer display site.

46. A system for delivery of targeted advertisements from a head end system to individual consumers at at least one consumer display site comprising:
 a control device at the at least one consumer display site; and
 a controller at the head end system responsive to a consumer's action for delivering a program, said program having at least one break;
 the controller at the head end system sending a command signal selectively to said at least one display site selecting a predetermined advertisement for display during said break intended for a particular consumer, the controller at the head end system including a program database supplying said program, a commercial database supplying advertisements, the commercial database further storing information concerning the type of each advertisement; a consumer database having information about a consumer at the at least one display site and an instruction formatter having inputs from the consumer database, the program database and the commercial database for generating the command signal for the control device at the at least one display site; the command signal being generated based on the type information stored in the commercial database and the information about the consumer at the at least one display site and optionally a characteristic of the program; the controller at the head end system further downloading the command signal to the control device at the at least one display site to command the control device to select an advertisement from the head end system for display at the at least one display site.

47. A system of claim 46 wherein an individually addressable digital recording device is installed at the consumer display site having a unique address, and further comprising
 a transmitter transmitting instructions to the recording device in advance of advertisement broadcast that will tell the display site which upcoming advertisement to display and which to ignore.

48. A system of claim 46 wherein a commercial processor is at the consumer display site to look for and display targeted incoming advertisements.

49. A system of claim 46 further comprising a circuit preventing a channel indicator from changing in response to viewer channel change requests during the display of a Road Block and/or targeted advertisement while preventing a tuner and/or digital demultiplexer from changing frequency and/or program data stream and after this advertisement is completed, the display site changes to the selected channel and/or program data stream.

50. A system of claim 46 further comprising storage provided at the consumer display site for storage at the display site of targeted advertisements for later viewing at the display site of targeted advertisements for later viewing at the display site.

51. A system of claim 46 including a central data base, a switched view on demand system including services that route advertisements to a consumer display site based on instructions transmitted from the central data base.

52. A system of claim 46 wherein a roadblocker is provided for simultaneously placing on all channels at the consumer display site the same targeted advertisement even though the consumer changes channel.

53. A system of claim 46 wherein a consumer classifier assigns consumers to a predetermined class of consumer for receiving a targeted advertisement intended for the class of consumers.

54. A system of claim 46 wherein an addressable instruction modulator receives the signal and places it in a form for transmission to the consumer display site.

55. A method for targeting TV advertisements from a head end system to consumers at at least one consumer display site comprising the steps of:
   preparing a set of TV advertisements;
   analyzing each advertisement as to its nature and focus;
   cataloging each advertisement and storing it in a central data base at the head end system
   selectively commanding the delivery of an advertisement to a consumer from the central data base that is targeted for that consumer, further comprising supplying program materials from the head end system into which at least one advertisement is to be inserted at the at least one display site, further comprising storing information at the head end system concerning the type of each advertisement; supplying said at least one advertisement to the at least one display site; storing information at the head end system about a consumer at the display site and generating an instruction at the head end system for a control device at the at least one display site, the instruction being generated based on the type information stored in the commercial database and the information about the consumer at the at least one display site and optionally a characteristic of the program materials; further comprising downloading the instruction to the control device at the at least one display site to command the control device to select the advertisement from the head end system for display at the at least one display site.

56. A method for targeting TV advertisements from a head end system to consumers at at least one consumer display site comprising the steps of:
   preparing a set of TV advertisements;
   analyzing each advertisement as to its nature and focus;
   cataloging each advertisement and storing it in a central data base;
   selectively commanding the delivery of an advertisement to a consumer from the central data base that is targeted for that consumer,
wherein the advertisements are classified into one of three categories which include
   (1) non-preemptable; (2) conditionally preemptable and (3) unconditionally preemptable.

57. A method of claim 55 including the step of storing the details of the advertisements' timing and where it will be found by the consumers TV channel selector in the central data base together with information indicating under what circumstances another advertisement may be substituted.

58. A method of claim 55 wherein each consumer subscribes to the targeted TV advertisements.

59. A method of claim 58 including the step of storing in the central data base characteristics of each subscribing consumer according to which commercials are best targeted to that subscribing consumer.

60. A method of claim 55 wherein signals are transmitted from the consumer viewing location to the central data base for reporting whether this consumer viewing location had its TV receiving equipment tuned to a specific channel.

61. A method of claim 55 wherein signals are transmitted from the consumer viewing location to the central data base for reporting the number of times a particular advertisement is displayed at this consumer viewing location.

62. A method of claim 55 wherein signals are transmitted from the consumer viewing locations to the central data base for commanding the delivering of advertisements in a predetermined order.

63. A method of claim 55 wherein signals are transmitted from the consumer viewing location to the central data base in response to the consumers request for additional advertisements related to an advertisement delivered to the consumer viewing location.

64. A method of claim 55 wherein the consumer viewing locations is directed to store data for later communications to the central data base.

65. A method of claim 55 wherein signals are transmitted from the consumer viewing location to the central data base that a commercial has been displayed, recognized by the consumer and acted upon by the consumer.

66. A method of claim 55 wherein the consumer viewing location is commanded which advertisement to view and which to ignore at this location.

67. A method of claim 55 wherein at the consumers display set the same targeted advertisement is simultaneously placed on all channels at the display site event though the consumer changes channel.

68. A method of claim 55 including the step of assigning consumers to a predetermined class of consumers for receiving a targeted advertisement intended for the class of consumers.

69. A method for targeting an advertisement from a head end system to consumers at at least one viewing site comprising the steps of:
   selectively delivering upon command from a control center at the head end system a predetermined advertisement for display at the at least one viewing site intended for a particular consumer, further comprising supplying program materials from the head end system into which the predetermined advertisement is to be inserted at the at least one display site, further comprising storing information at the head end system concerning the type of each advertisement; providing a plurality of advertisements at the control center, storing information at the head end system about a consumer at the at least one viewing site and generating an instruction at the head end system for the at least one viewing site, the instruction being generated based on the type information stored in the commercial database and the information about the consumer at the at least one viewing site and optionally a characteristic of the program materials; further comprising downloading the instruction to the at least one viewing site to command a control device at the viewing site to select the predetermined advertisement from the head end system for display at the at least one viewing site.

70. A method for targeting advertisements from a head end system to consumers at at least one display site comprising the steps of:

delivering a program and plurality of advertisements to the at least one display site for display; and selectively commanding the display of a first advertisement at said at least one display site from a control center while preventing the display of the remaining plurality of advertisements, further comprising supplying said program from the head end system into which the first advertisement is to be inserted at the at least one display site, supplying said plurality of advertisements to the at least one display site, further comprising storing information at the head end system concerning the type of each advertisement; storing information at the head end system about a consumer at the at least one display site and generating an instruction for the at least one display site; the instruction being generated based on the type information stored in the commercial database and the information about the consumer at the at least one display site and optionally a characteristic of the program; further comprising downloading the instruction to the at least one display site to command the at least one display site to select the first advertisement from the head end system for display at the display site.

* * * * *